Aug. 12, 1941.   R. K. JEFFREY   2,252,598
DRILLING MECHANISM
Filed Sept. 1, 1938
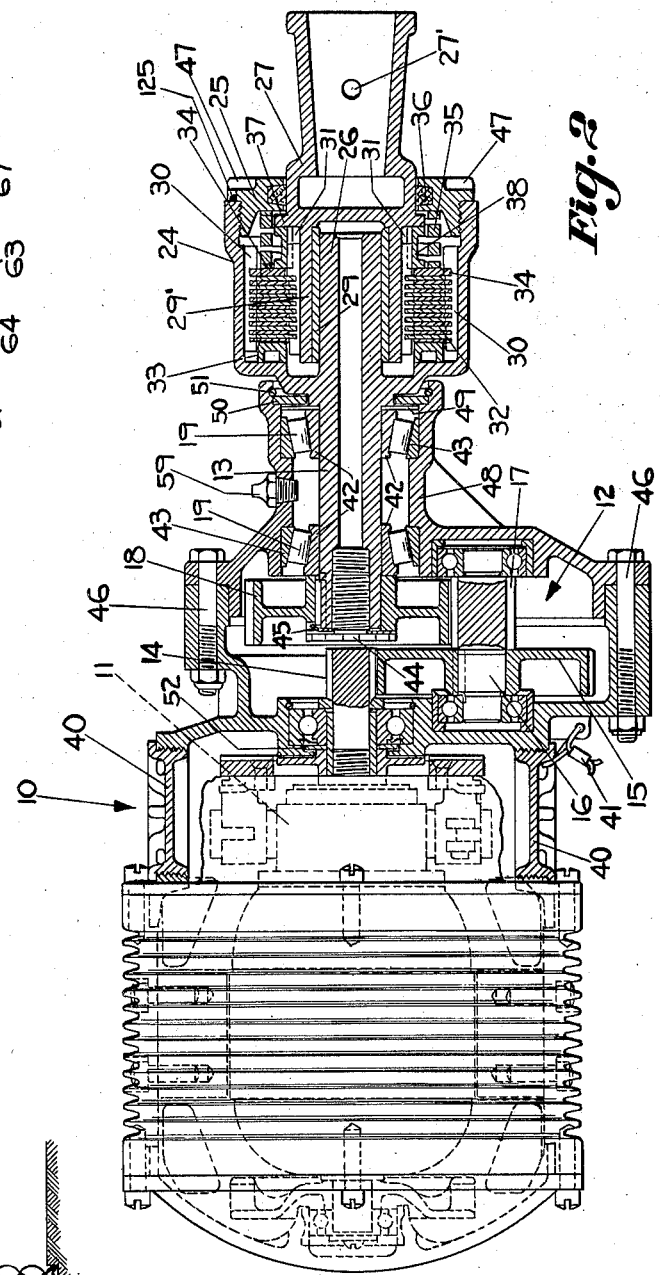
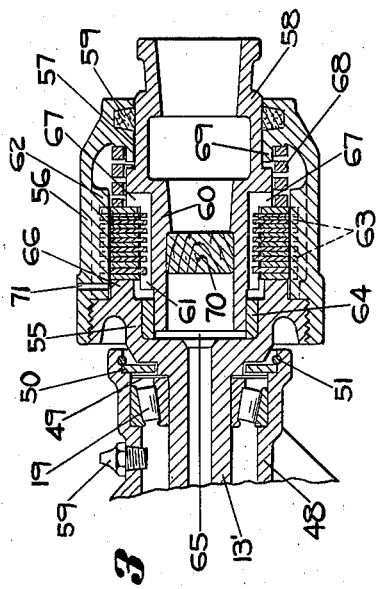
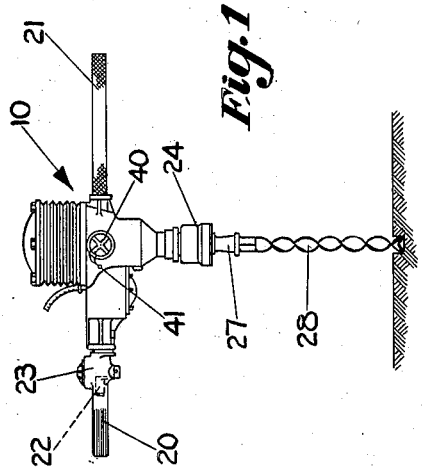
INVENTOR:
ROBERT K. JEFFREY,
BY
Chas. M. Nissen
ATTY.

Patented Aug. 12, 1941

2,252,598

UNITED STATES PATENT OFFICE 2,252,598

DRILLING MECHANISM

Robert K. Jeffrey, Columbus, Ohio, assignor to The Jeffrey Manufacturing Company, a corporation of Ohio Application September 1, 1938, Serial No. 227,996

13 Claims. (Cl. 64—30)

This invention relates to a hand operated drilling mechanism and an object of the invention is to provide in such a mechanism a safety device in the form of a friction clutch which limits the torque on the drill frame thereby protecting the operator who must hold the drill in his hands during operation.

Another object of the invention is to provide in a mechanism of the above mentioned type an automatically operable friction safety clutch in which the release torque may be automatically varied by the simple expedient of varying the thrust on the drill bit thereby making the safety release automatically variable for different operators. Still another object of the invention is to provide an improved safety release clutch for a hand operated drill which is completely enclosed and which is outside the main drill housing and which can be attached to standard drills now in operation.

Other objects of the invention will appear hereinafter, the novel features and combinations being set forth in the appended claims.

In the accompanying drawing,

Fig. 1 is a plan view of the drill comprising my invention;

Fig. 2 is a side elevational and sectional view showing certain structural details thereof; and Fig. 3 is a sectional view of a modified and preferred form of safety clutch comprising my invention.

It has been found in practice that some safety feature should be provided for a hand operated drill to prevent injury to an operator in case the drill bit becomes stuck because if the drill is provided with a powerful motor or the motor is rotated at a high speed the reaction torque on the motor frame which must be resisted by the operator who supports the drill by handles becomes very large and one which most operators cannot resist. At the same time, it is desirable that the slippage torque of the safety mechanism be automatic because operators of different sizes and strength or more than one operator may operate the same drill. It is, of course, manifest that a small man must be protected by a lower release torque than a large and strong man, or that two men can resist a considerably higher torque than one man. Therefore, to obtain the maximum amount of work from a drill which the operator or operators can safely gain from it, the safety torque releasing clutch should operate automatically to compensate for the strength or number of the operators. This has been provided in the structure of the instant application.

By reference to Figs. 1 and 2 of the drawing, it will be seen that the hand drill comprising my invention includes a main frame 10 which forms a housing for the electric driving motor 11, access to the brushes of which is provided by threaded openings provided with closures 40, sealed to housing or frame 10 by seals 41, and the reduction gearing 12 which drives the shaft 13 from said motor 11, the housing being formed in two parts bolted together by bolts 46. The gearing 12 includes a pinion 14 formed on the shaft of the motor 11 which drives a large gear 15 keyed to shaft 16 mounted at opposite ends in appropriate anti-friction ball bearings, which shaft 16 has an integrally formed pinion 17 which meshes with a gear 18 keyed and removably bolted to the drive shaft 13 by a bolt 44 held locked by lock washer 45. The shaft 13 is mounted in anti-friction roller thrust bearings 19 having inner races 42 and outer races 43 which hold it against longitudinal movement in neck 48 of the gear casing 12 while mounting said shaft 13 for free rotation.

Between neck 48 of housing 10 and safety clutch housing 24 is a flame and grease seal provided by a rotating washer 49 pressed between an inner race 42 and a shoulder on shaft 13 and positioned near a stationary disc 50 carried in the mouth of neck 48 and held in place by a snap ring 51. This seal is such that should any sparks in housing 10 cause an explosion of gas therein, no flame can reach a gaseous atmosphere outside the housing 10. A labyrinth seal at 52 between the motor housing 10 and gear housing 12 also adds to this flame seal feature. Grease for bearings 19, 19 is supplied to neck 48 of casing 12 by way of fitting 59.

As clearly seen by reference to Fig. 1 of the drawing, a pair of supporting handles 20 and 21 is provided for supporting the drill. Associated with the handle 20 is an operating lever 22 by which a control switch mounted in housing 23 is operated to control the starting and stopping of the motor 11.

It may be stated that the general structure of the drill, except for specific differences herein pointed out, is disclosed in full detail in my Patent No. 2,159,087, granted May 23, 1939, for an improvement in a Drilling machine, except for the switch control which is disclosed in the patent to Walter J. Bauroth, Patent No. 2,159,071, granted May 23, 1939, for an improvement in a Drill.

Formed integral with the drive shaft 13 is a safety clutch housing 24 provided with a removable enclosing ring cap 25 having wrench receiving notches 47 and which is screw-threaded into the housing and preferably spot welded to the housing 24 at one spot 125 after the parts are assembled which makes the housing completely enclosed for a purpose hereinafter described.

The shaft 13 has an extension 26 which extends into the housing 24 and upon which is journaled for free rotation the lining 29 secured to a sleeve 29' of a bit socket 27 adapted to receive a drill bit 28 held in socket 27 by any desired means such as a pin passing through hole 27' therein and an aligned hole in the bit shank. The housing 24 and the sleeve 29 are provided with splines 30 and 31, respectively, which receive overlapping friction plates 32, alternate ones of which are splined for rotation with the housing 24 and sleeve 29, respectively, it being understood that said friction plates 32 are mounted for relatively free longitudinal movement whereby they may be compressed to provide a friction drive between the housing 24 and the socket 27.

Adjacent to its rear end the housing 24 carries a removable abutment ring 33 and adjacent to its forward end there is splined on the splines 30 another abutment ring or wear plate 34 between which rings the friction plates 32 are compressed to effect the aforementioned friction drive. Within the housing 24 is a helical spring 35 which at one end abuts the abutment ring 34 and which at the other end abuts the inner annular flat face of the ring cap or closure 25 thereby applying a predetermined pressure to compress the friction plates 32.

It may also be mentioned that the cap 25 is provided with a wiping seal or packing gland 36 to provide an effective closure between the drill socket 27 and said cap 25.

It is evident that the spring 35 will exert a predetermined substantially constant pressure upon the friction plates 32 which will provide the minimum release torque, or in other words, the minimum torque at which the drill bit 28 and socket 27 will slip with respect to the drive shaft 13 and housing 24. This pressure may be set at the factory for the estimated minimum desired slip torque, or in other words, for a relatively small operator who may operate the drill. To a limited extent compression of the spring 35 may be adjusted by adjustment of the ring 25 relative to the casing 24 and locked in adjusted position by spot welding as hereinbefore explained.

In order to provide for the automatic increase of the slip torque thereby to compensate for a stronger operator, or for the case where more than one operator handles the drill at one time, means are provided to increase the friction between the plates 32 by the simple expedient of manually increasing the feeding thrust longitudinally of the drill, or in other words, the feeding thrust on the drill bit 28. In this connection, it is to be noted that the sleeve 29' of the socket 27 is mounted for both rotation and longitudinal movement on its journal bearing and on the extension 26 of drive shaft 13.

Splined on the splines 31 to rotate with the bit socket 27 and positioned between a circumferential flange 37 of the bit socket 27 and the abutment ring 34, is a circumferentially grooved compression ring 38 serving to space the ring 34 from the inner annular flat seat in the ring closure 25 and also serving to assist the annular flange 37 in holding the spring 35 concentric with the ring 34. The inner flaring locates the annular seat in conformance with the diameter of the spring. It is thus manifest that by increasing the feeding thrust on the drill bit 28 the casing 24 will be moved to the right, as viewed in Fig. 2 of the drawing, and through compression ring 38 will increase the pressure upon the friction plates 32. By this means it is manifest that an operator or a plurality of operators who are operating the drill may, by the simple expedient of increasing the feeding thrust, increase the release torque of the safety friction clutch. Furthermore, it is the natural instinct of an operator to release the feeding thrust on the drill in case the bit 28 tends to jam or bind, whereby the operator will automatically reduce the release torque in case of such binding or jamming.

It may be stated that the housing 24 is preferably sealed against opening by spot welding the cap 25 in place after it is assembled though, of course, the weld may be removed when desired and the cap 25 unscrewed to render the interior mechanism accessible for repairs when necessary. Furthermore, said housing 24 is preferably supplied with a dry lubricant in the form of graphite which has a very desirable coefficient of friction in that it is substantially uniform under wide varieties of temperature and age and thus the minimum release torque of the safety device is substantially constant with age and temperature.

In Fig. 3 of the drawing there is illustrated a modified and a preferred form of safety clutch, being distinguished particularly from the clutch of Fig. 2 in that it is more compact and of less overall length. The safety clutch of said Fig. 3 includes a drive shaft 13' which is supported in the neck 48 of the drill and driven in the same manner that drive shaft 13 is supported and driven. Said drive shaft 13' is provided with an integral head 55 which is threaded into a housing 56 having a front opening 57 into which extends a bit socket 58. A seal or packing 59 is provided adjacent the opening 57 and co-operates with the bit socket 58 to seal the interior of the housing 56. Formed integral with and a part of the rear portion of the big socket 58 is a sleeve 60 provided with peripheral splines 61. The interior of the housing 56 is also provided with splines 62. The splines 61 and 62 receive stacked friction discs 63 alternate ones of which are received by said splines 61 and 62, respectively, thereby providing a friction drive between the housing 56 and the socket 58 when said discs 63 are pressed into frictional contact with each other, as hereinafter described.

At its rear end the sleeve 60 is journaled on a journal bearing 64 carried in a recess 65 formed in the head 55. In the normal position of adjustment of the parts, as illustrated in Fig. 3 of the drawing, the rear end of the sleeve 60 is spaced from the bottom of the recess 65, thus permitting axial movement of said bit socket 58 to increase the normal friction between the discs 63, for the purpose of increasing the releasing torque of said safety clutch. To provide the normal releasing torque of the safety clutch, the head 55 is provided with an integral abutment ring 66 adapted to abut one of the end discs 63. The opposite end disc 63 abuts shoulders 67 formed integral with the bit socket 58 and sleeve 60. It is thus obvious that relative movement between the bit socket 58 and the head 55 will vary the frictional drive of the discs of the safety clutch. The normal frictional drive thereof is provided by a helical spring 68 which at its forward end abuts the forward inner portion of the housing 56 and there is retained in place by an integral flange 69 of said housing, and at its rearward end abuts the forward end disc 63.

It is manifest that this helical spring 68 will provide a predetermined pressure between the friction discs 63, which will provide for a normal torque release safety clutch. It is furthermore evident that by increasing the thrust on the bit socket 58 in a manner analogous to that above described in connection with the safety clutch of Fig. 2, this release torque may be increased above the normal value.

To prevent dirt reaching the journal bearing 64, the sleeve 60, which is hollow, is provided with a wood plug 70 which is held in place by friction.

Near the rear end of the housing 56 there are provided three holes, one of which is seen at 71, which are equally spaced about the periphery of the device, the purpose of which is hereinafter described, being related particularly to the assembly of parts. To assemble the clutch, as illustrated in Fig. 3, the journal bearing 64 is first inserted in the head 55. The packing 59 is then soaked in a proper lubricant, such as graphite oil, and inserted in the groove provided therefor in the opening 57 of housing 56. The wood plug 70 is then driven into the sleeve 60. The discs 63, including both of the end discs, the forward one of which is preferably slightly heavier, are placed upon the sleeve 60, alternate ones being splined to the splines 61 thereof. The helical spring 68 is then inserted in place in the housing 56, and the assembled parts comprising the socket 58, plug 70 and discs 63 are put into said housing 56 with the proper alternate discs 63 splined with the splines 62 on the interior of said housing 56. These assembled parts are then compressed either by using a vise or drill press for compressing the spring substantially solid, after which three No. 8 nails are inserted into the three holes 71 to hold the parts in place, after which the assembled parts are removed from the vise or drill press. After appropriate grease is applied to the threads of the head 55 as well as to the bushing 64, said head 55 is screwed into the rear end of the housing 56 until the abutment ring 66 contacts the above described nails. The nails are then removed and the head 55 is screwed tightly into said housing 56. It may be stated that the threads of the head 55 and housing 56 are such that when the drill is in operation these parts tend to become tightly attached rather than to become unthreaded.

As was above suggested, the safety release clutch of Fig. 3 has a less overall length than that disclosed in Fig. 2, particularly in that the bit socket 58 is very largely within the confines of the housing 56. This makes for a very short and compact safety clutch and affords appreciable protection for the bit socket 58.

In the operation of the device, one or more operators support the drill by the handles 20 and 21 and control the starting and stopping of the motor by the lever 22. The operator or operators will, of course, apply their weight to the drill to move it longitudinally along the axis of the bit 28 to effect a drilling operation. By the simple expedient of increasing or decreasing this feeding thrust the release torque of the safety clutch is automatically adjusted so that the drill may be operated at the maximum capacity of the operator or operators at all times.

In case the bit 28 becomes jammed or bound thereby throwing a large reaction torque on the handles 20 and 21, the safety clutch will automatically operate to prevent rotation of the drill frame 10 which might injure the operator or operators. Furthermore, the natural instinct to withdraw from the drill whenever jamming or binding is realized will automatically reduce the release torque to a minimum.

It is thus manifest that a very simple and efficient automatic torque release which is automatically adjustable to compensate for different operators has been provided which will prevent injury to an operator in case the drill bit becomes jammed or bound.

While this torque release is particularly useful with hand operated drills it is not so restricted as it is also useful with mounted drills because the torque limiting clutch protects the bit 28 and limits the torque which may be applied thereto, thereby preventing damage or breakage thereof by excessive torque.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A torque limiting clutch for drills comprising a housing forming a driving member, a socket including a sleeve slidably mounted in said housing, engaging friction plates carried by said housing and sleeve respectively, means urging said plates into contact to effect a torque limiting driving relation between said housing and socket, and means operable responsive to longitudinal movement of said socket to increase the value of said limiting torque.

2. In a drill, the combination with a frame, of a drill socket, a motor for driving said socket, a shaft having an integral clutch housing formed thereon, said socket being mounted on a journal within said housing, friction means providing a releasable connection between said housing and socket, means providing a predetermined driving torque between them, said socket mounting being constructed and arranged to provide for an increase in said driving torque while the device is in operation.

3. In a drill, the combination with a frame, of a motor mounted thereon, a drill socket, means for driving said drill socket from said motor including a shaft having a threaded head, a clutch housing threaded onto said head, said socket extending into said housing and being journaled on said head, a spring surrounding said socket and within said housing, friction plates releasably connecting said housing and socket and being compressed by said spring to provide a predetermined torque releasing drive for said socket, said socket being slidable longitudinally and having means thereon to increase said releasing torque in response to increased thrust thereon.

4. In a drilling machine, the combination with a supporting frame, of a motor carried thereby, a drill socket, a clutch connecting said motor and said drill socket, resilient means for applying said clutch to predetermine its torque limit before slipping, and means carried by the said socket in position to apply such clutch independently of said resilient means by feeding movement of the drill socket to effect increase of the torque limit of the clutch before slipping.

5. Drilling apparatus comprising the combination with a supporting frame, of a motor carried thereby, a drill bit socket, means connecting said motor and bit socket including a torque limiting clutch, said clutch comprising driving and driven friction plates, a spring urging said plates into frictional engagement to effect a driving relation to a limiting torque, and means on the drill socket for applying the clutch independently of said spring for increasing the limiting torque by increased feeding pressure exerted on the drill socket.

6. Drilling mechanism comprising the combination with a supporting frame, of a motor mounted thereon, a drill bit socket, means connecting said motor and drill bit socket including a torque limiting clutch, said clutch comprising interengaging friction plates, spring means urging said plates into frictional engagement to effect a driving relation to a limiting torque, a longitudinally slidable member applicable directly to said clutch independently of said spring means to increase the friction between said plates over that afforded by said spring means, and means for operating said slidable member to thus apply said clutch responsive to additional feeding force applied to said drill socket.

7. A drilling machine comprising the combination with a supporting frame, of a motor thereon, a drill bit socket, means connecting said motor and drill bit socket including a torque limiting clutch, said clutch comprising interengaging friction plates, spring means urging said plates into frictional engagement to effect a driving relation to a limiting torque before slipping, and mechanism operable independently of said spring but operating in adidtion thereto directly on said clutch to increase the friction between said plates over that afforded by the spring means alone, such additional friction serving to increase the limiting torque before slipping.

8. A drilling machine comprising the combination with a supporting frame, of a motor mounted thereon, a drill bit socket, means connecting said motor and drill bit socket including a torque limiting clutch, said clutch including driving and driven clutch plates in frictional engagement, spring means applied to said clutch to urge said plates into engagement to effect a driving relation to a limiting torque, mechanism mounted on the drill bit socket in position to directly apply pressure to said clutch to positively add to the pressure applied by the spring means to the clutch, handles extending in opposite directions from said frame, and motor controlling means on one handle, both handles serving to feed the drilling machine manually, the construction and arrangement being such that the positive application of the clutch may be effected by increased manual feeding pressure on the drilling machine applied by the operator on said handles.

9. In a drilling machine, the combination with a supporting frame, of a drill socket adapted to receive a drill bit, means for driving said drill socket including a friction torque limiting clutch; said clutch including a driving member, clutch plates rotatable thereby, and a sleeve on said socket carrying said clutch plates in co-operation with the first-named clutch plates; spring means urging said plates in frictional engagement to provide a torque limiting drive, and means on the said socket applicable directly to said clutch independently of said spring means upon increased feeding pressure applied to said drill socket to vary the value of said limiting torque in response to the feeding thrusts upon it, the spring pressure on the clutch being substantially constant whereas the feeding thrust on the clutch being variable.

10. In a drilling machine, the combination with a supporting frame, of a motor mounted thereon, a drill socket adapted to receive a drill bit, means for driving said drill socket from said motor including a friction torque limiting clutch; said clutch including a driving member, clutch plates rotatable thereby, and a sleeve on said socket carrying clutch plates in co-operation with said first-named clutch plates; spring means urging said plates in frictional engagement to provide a torque limiting drive, direct clutch applying means on said sleeve operable independently of said spring means, and means affording sliding movement of said socket and direct clutch applying means relatively to said supporting frame, the construction and arrangement being such that after said limiting torque is reached increased feeding pressure on the drill will cause said direct clutch applying means to be added to the spring means to increase the limiting torque.

11. A safety clutch comprising a driving member and a driven member, driving and driven friction clutch means connected to said driving and driven members respectively, spring means urging said clutch means into driving relation to a torque limiting value, said driven member being adapted to carry a drill bit socket, a bearing for supporting said driven member axially of the drill, and mechanism on said driven member in position to directly engage one end of said friction clutch means to apply the latter independently of said spring means, said direct clutch applying means being operable responsive to increased feeding pressure to cause said sleeve to slide rearwardly on its bearing to effect increase in the value of the torque limit, the spring means clutch applying pressure being substantially constant.

12. In a drilling machine, the combination with a supporting frame, of a motor mounted thereon, a drill socket adapted to receive a drill bit, means comprising a friction clutch connecting said motor to said drill socket to drive the same and the drill bit connected thereto, manual means connected to said frame for feeding the drill, resilient clutch applying means for predetermining the torque limit of the clutch in accordance with the strength of the operator to hold the frame against turning during application of torque by the motor to rotate the drill, and means connected to the drill socket and mounted on said frame for sliding movement relatively thereto in position to effect a direct application of the friction clutch independently of the said resilient means by increasing the feeding pressure to enable a stronger operator to hold the frame against turning unduly when the increased torque limit is reached and the clutch slips.

13. In a drilling machine, the combination with a supporting frame, of a drill socket, a motor, a shaft connected to said motor to be driven thereby, a clutch housing connected to said shaft to rotate therewith, a bearing within said housing, a sleeve connected to said drill socket and journaled on said bearing, friction clutch plates between said housing and said sleeve, means acting on said clutch plates to provide a predetermined driving torque between said shaft and said drill socket, and additional means bodily movable with the drill socket for acting on said clutch plates to provide an increase in the driving torque while the drill is in operation.

ROBERT K. JEFFREY.